United States Patent

[11] 3,575,155

| [72] | Inventor | Wilmer Dale Byrd<br>Bedford, Ind. |
|---|---|---|
| [21] | Appl. No. | 716,283 |
| [22] | Filed | Mar. 20, 1968 |
| [45] | Patented | Apr. 20, 1971 |
| [73] | Assignee | Ingalls Stone Company, Inc.<br>Bedford, Ind. |

[54] MACHINE TOOL (STONE GROOVER)
11 Claims, 7 Drawing Figs.
[52] U.S. Cl. ................................................. 125/3, 125/5
[51] Int. Cl. .................................................. B28d 1/18
[50] Field of Search ........................................... 125/2, 3, 5, 4, 25; 299/92

[56] References Cited
UNITED STATES PATENTS
462,157 10/1891 Pederson...................... 125/1

FOREIGN PATENTS

| 514,861 | 12/1930 | Germany...................... | 125/2 |
| 127,815 | 6/1948 | Australia...................... | 125/3 |
| 726,573 | 1/1966 | Canada ....................... | 299/92 |

Primary Examiner—Harold D. Whitehead
Attorney—Trask, Jenkins & Hanley

ABSTRACT: A machine for producing decorative, irregular striations in the face of building stone, comprising a conveyor for moving the stone to be striated past a rotating drum carrying a multiplicity of stone-grooving teeth distributed axially and circumferentially on the cylindrical face of the drum. Each tooth is supported from the drum through a resiliently yieldable mounting permitting limited displacement of the tooth axially, radially, and circumferentially of the drum under the influence of the cutting effort. If desired, the drum may be mounted for reciprocation axially of itself and transversely to the path of conveyor movement.

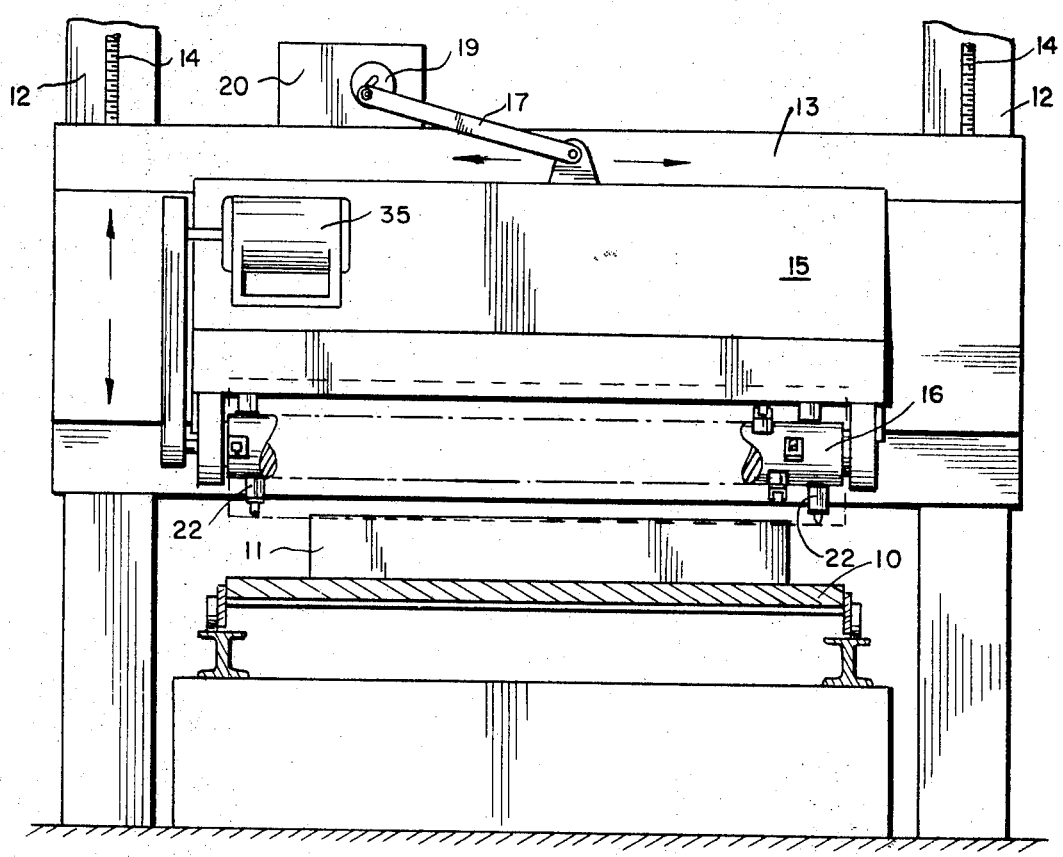
Fig. 1
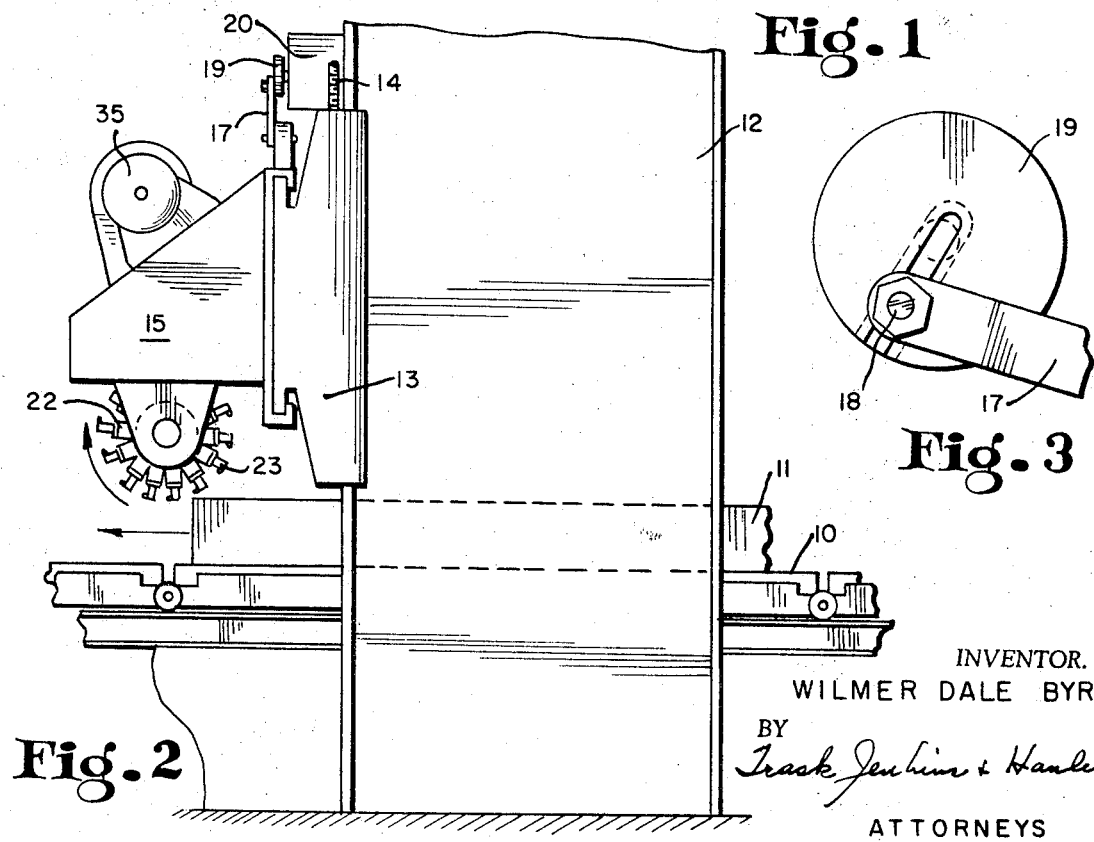
Fig. 2
Fig. 3
INVENTOR.
WILMER DALE BYRD

INVENTOR.
WILMER DALE BYRD

MACHINE TOOL (STONE GROOVER)

It has heretofore been proposed to decorate the exposed faces of building stone by striating such faces. In such decorated stone, the striations have been substantially parallel to each other and continuous in extent. While such striations have a certain appeal to architects and others as breaking the flat surface of the stone, it has been found that the regularity of the continuous, parallel striations is regarded by many as somewhat undesirable. It is therefore an object of this invention to provide a machine which will produce on the exposed face of building stone more or less randomly irregular striations of limited length.

A preferred form of machine for carrying out the invention comprises a conveyor on which the stone to be striated is supported and carried through the machine. Arranged at opposite sides of the conveyor are a pair of uprights carrying a vertically adjustable, horizontally extending cross rail supporting a rotating drum that carries the striating tools. Preferably, the drum is mounted in a carriage which is reciprocable longitudinally of the rail and transversely of the conveyor path, and power-operated means is provided for so reciprocating the carriage. Distributed over the cylindrical surface of the drum are a plurality of outwardly opening, tool-receiving sockets, each of which contains a cuplike liner of resilient material through which a tooth or cutting tool is supported. As the stone passes through the machine on the conveyor, the tools on the rotating drum cut striations in the upper face of the stone, and the resilient cups through which the tools are supported permit the tools to be randomly displaced axially, radially and circumferentially of the drum under the effect of the varying reactions which the stone imposes on the tools.

In the accompanying drawings, which illustrate one embodiment of the invention:

FIG. 1 is a front elevational view of a striating machine showing only a few of the striating tools;

FIG. 2 is a side elevation of the machine shown in FIG. 1;

FIG. 3 is an elevational view illustrating a detail of a mechanism by which a reciprocating drum-carriage can be reciprocated;

Figure 4:
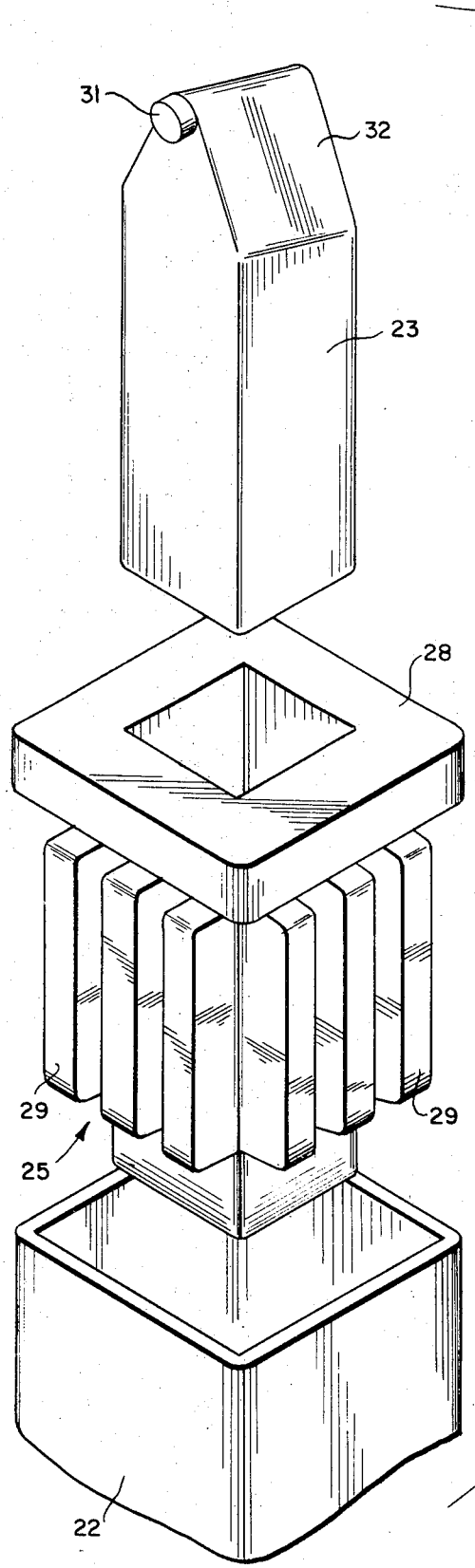
FIG. 4 is an exploded isometric view showing a tool-supporting socket, the resilient cup with which such socket is to be lined, and the cutting tool to be supported in the cup.

The machine shown in FIGS. 1—3 in the drawing comprises a conveyor 10 which carries through the machine the stone 11 to be striated. Such stone is conveniently a relatively large slab which, after being striated, will be sawed into blocks of a size appropriate for use in facing a building. A pair of uprights 12 disposed at the sides of the conveyor support for vertical sliding movement a crossrail 13 which extends horizontally above and across the conveyor 10. Any appropriate means, shown as including adjusting screws 14, is provided for positioning the rail 13 at the desired height. Mounted on the rail 13 for sliding movement longitudinally thereof and transversely of the conveyor is a carriage 15 on which is rotatably mounted a striating drum 16 that extends in parallel relation to the rail 13. For the purpose of reciprocating the carriage 15 on the rail 13, it may be connected through a link 17 to a pin 18 eccentrically located on a rotating element 19 driven by means indicated diagrammatically at 20 in FIGS. 1 and 2. As indicated in FIG. 3, the pin 18 is desirably adjustable radially in the element 19 to vary the distance over which the carriage reciprocates.

Figure 5:
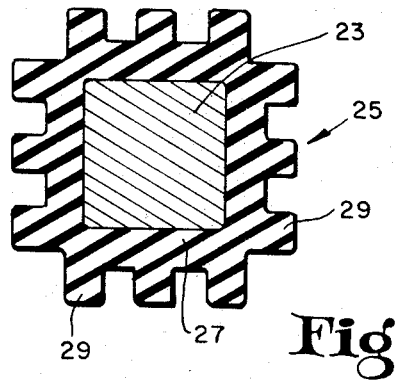
FIG. 5 is a cross section through a tool and its supporting cup prior to insertion of the latter into its socket.
Figure 6:
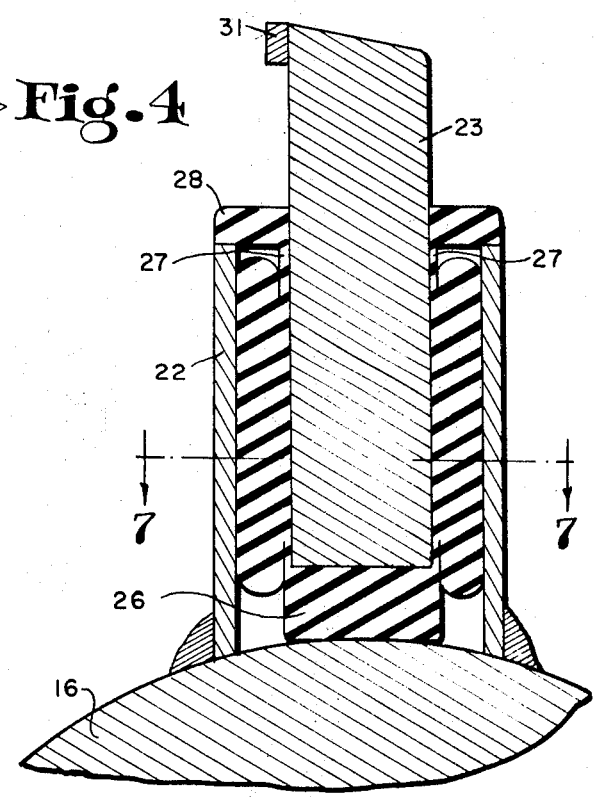
FIG. 6 is a fragmental section transversely through the drum in the plane of a striating tool.

Distributed over the cylindrical face of the drum 16, and secured thereto as by welding, are a multiplicity of sockets 22 each of which supports a striating tool 23. As previously indicated, each of the striating tools is mounted in its associated socket through a resilient support which is capable of yielding to permit the tool to be displaced axially, circumferentially, and radially of the drum 16. A preferred form of tool-supporting means, shown in detail in FIGS. 4—7, comprises a cup 25 of resilient material, preferably soft rubber of about 50 durometer. Each of the sockets 22 is desirably square in cross section, as is also the body of each tool 23. The cup 25 has a relatively thick bottom wall 26 and sidewalls 27 upper ends of which join an integral, outwardly projecting flange 28. Extending along each sidewall of the cup, from a point somewhat inwardly of the flange 28 to a point somewhat outwardly from the bottom of the cup, are a plurality of integral ribs 29 which are spaced apart, as shown in FIGS. 4 and 5.

Figure 7:
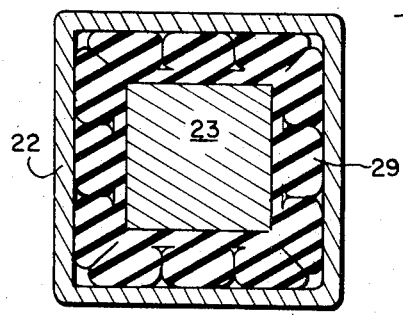
FIG. 7 is a section on the line 7—7 of FIG. 6.

The interior dimensions of the cup 25 are such as will permit it to receive snugly the body of the tool 23. The exterior transverse dimensions of the cup, over the ribs 29, are somewhat greater than the interior dimensions of the socket 22, so that when the cup and tool are inserted into the socket the ribs 29 will be substantially compressed, expanding laterally of themselves into the spaces between the ribs, as shown in FIG. 7. Longitudinally of itself and radially of the drum 16, the cup is so proportioned that when the cup-bottom 26 rests on the surface of the drum 16, the cup-flange 28 will be in contact with the upper end of the socket to exclude stone chips and dust therefrom.

The outer end of each cutting tool 23 is formed to provide striations of the desired cross-sectional shape. The tool shown is provided with an abrasive-resistant, circular cutting tip 31 mounted at the extreme outer end of the tool, and the sides of the tool are beveled tangentially to such cutting tip, as shown at 32.

Any appropriate means may be provided for rotating the drum 16. As shown, the drum is driven from an electric motor 35 (FIGS. 1 and 2) mounted on the carriage 15 and operatively connected to the drum 16 through any appropriate type of power-transmitting mechanism. As a slab of stone 11 is carried through the machine by the conveyor 10, the rotating tools 23 cut striations in the upper face of the stone, the depth of such striations being generally controlled by vertical adjustment of the crossrail 13. Because of the yielding mounting of the cutting tools, each of them is subject to displacement axially, circumferentially, and radially of the drum 16 under the reaction imposed on it by the stone. As a result, the striations cut in the stone are randomly irregular in form and depth and impart to the striated face a decorative, attractive appearance. Although reciprocation of the carriage 15 on the rail 13 is not required for the formation of randomly irregular grooves, it does increase to some extent their irregular appearance.

In an actual machine which produced very satisfactory results, the tool-tip 31 had a diameter of ¼ inch, the cup measured 2 inches over the uncompressed ribs 29, and the interior dimension of the square socket was 1 ¾ inches. The radial distance from the drum 16 to the outer end of the cutting tool 23 was 8 inches. While the rotational speed of the drum relative to the rate of travel of the conveyor 10 may be varied, as by providing a variable speed drive for the conveyor, excellent results have been obtained with a drum-speed of about 25 r.p.m. with the conveyor moving at a rate of about 4 feet per minute. As indicated by the arrows in FIG. 2, it is preferred that the tools, while cutting, move in the same horizontal direction as the conveyor but, of course, at a more rapid rate.

The sockets 22 are desirably distributed circumferentially of the drum in such a manner as to maintain as uniform as possible the torque which must be applied to the drum. It is also desirable that the sockets be so distributed on the drum that any two tools cutting at the same time will be spaced apart far enough to minimize the possibility of chipping the stone between their respective cuts. Conveniently, the sockets are disposed in helical rows with the sockets equally spaced in each row and staggered axially relative to the sockets in other rows. In the actual machine referred to above, the drum, which was 7 ½ inches in diameter, bore two helical rows of sockets spaced in each row at center distances of 2 inches.

As with the rate of drum rotation, the depth of the striations produced by the striating tools may vary, depending upon the results desired. Because of the possiblity of radial movement of each tool relative to the drum, the depth of the striations may not be uniform; but the rail 13 is most desirably positioned vertically so that none or little of the face of the stone is left unstriated.

If the carriage 15 is reciprocated, its rate of reciprocation, as well as the length of its stroke, may vary. At the drum and conveyor speeds mentioned above, an appropriate rate of carriage reciprocation is 16 per minute. Stroke lengths used have varied from ½ to 1 inch.

I claim:

1. In a machine for producing irregular striations in the face of an article which offers varying resistance to a striating tool, said machine comprising a power driven rotating element having a plurality of axially spaced and circumferentially distributed striating tools, and a conveyor for moving an article to be striated through cutting association with said tools; means for independently supporting each of said tools on the rotatable element, said means permitting, but resiliently opposing, substantial displacement of the tool from a normal position relative to said element and to the other independently supported tools under the influence of the varying resistance of the article on the tool whereby the striations produced by the tool as it passes across the article-face will be of nonuniform shape.

2. A machine according to claim 1 wherein said resilient means permits displacement of the tool in a direction axially of the rotating element.

3. A machine according to claim 1 wherein said resilient means permits displacement of the tool in a direction circumferentially of the rotating element.

4. A machine according to claim 1 wherein said resilient means permits displacement of the tool in a direction radially of the rotating element.

5. A machine according to claim 1 wherein said resilient means permits displacement of the tool in a direction axially, circumferentially, and radially of the rotating element.

6. A machine according to claim 1 wherein said tools are disposed in helical rows with the teeth in each row axially staggered with respect to the tools of the other rows.

7. A machine according to claim 1 with the addition of means for axially reciprocating said rotating element in time relation to the rate of movement of the conveyor.

8. A machine according to claim 1 wherein said tool-supporting means comprises a rigid socket, and a tool-receiving liner of resilient material disposed in the socket, said liner being so dimensioned that its material is compressed when it and the tool are in place in the socket.

9. A resilient mounting for an elongated striating tool, comprising a rigid socket having an open end, a tool-receiving cup insertable into said socket through said open end, said cup being provided exteriorly with a plurality of spaced, longitudinally extending ribs and formed of resilient material and so dimensioned that its material is compressed when it and the tool are in place in the socket.

10. A mounting according to claim 9 with the addition that said cup is provided with an outwardly projecting flange overlying and closing the open end of the socket.

11. A process for permanently decorating a face of a stone slab or block with irregular striations, which comprises passing a plurality of striating tools across such face generally along predetermined, spaced normal paths while permitting but resiliently opposing independent deflection of each tool from its normal path in response to local variations in the resistance the stone offers to striation.